United States Patent
Sathya et al.

(10) Patent No.: US 12,088,637 B2
(45) Date of Patent: Sep. 10, 2024

(54) SYSTEM AND METHOD FOR SHARING MEDIA RESOURCES FOR NETWORK BASED COMMUNICATION

(71) Applicant: Jio Platforms Limited, Ahmedabad (IN)

(72) Inventors: Pramod Belekare Nagaraja Sathya, Karnataka (IN); Bharathkumar Reddy Mallepalli, Karnataka (IN); Anurag Somani, Maharashtra (IN); Venkata Subrahmanyam Gajavalli, Karnataka (IN); Keshav Kumar Halli Mysore Kishor Kumar, Karnataka (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 51 days.

(21) Appl. No.: 17/708,791

(22) Filed: Mar. 30, 2022

(65) Prior Publication Data
US 2022/0321420 A1  Oct. 6, 2022

(30) Foreign Application Priority Data
Mar. 31, 2021 (IN) .............................. 202121014779

(51) Int. Cl.
*H04L 65/1059* (2022.01)
*H04L 65/40* (2022.01)
*H04L 67/51* (2022.01)

(52) U.S. Cl.
CPC .......... *H04L 65/1059* (2013.01); *H04L 65/40* (2013.01); *H04L 67/51* (2022.05)

(58) Field of Classification Search
CPC ............................ H04L 65/1059; H04L 65/40

USPC ......................................................... 709/224
See application file for complete search history.

(56) References Cited

U.S. PATENT DOCUMENTS

| | | | |
|---|---|---|---|
| 11,304,246 B2* | 4/2022 | Ponnusamy | H04W 4/80 |
| 2007/0299737 A1* | 12/2007 | Plastina | G06Q 30/0633 |
| | | | 705/14.1 |
| 2012/0092444 A1* | 4/2012 | Mackie | H04M 3/5315 |
| | | | 348/14.12 |
| 2014/0165090 A1* | 6/2014 | Andreasen | H04L 63/0815 |
| | | | 725/25 |
| 2021/0136846 A1* | 5/2021 | Ponnusamy | H04W 4/80 |
| 2021/0344520 A1* | 11/2021 | Hannu | H04N 21/4788 |

* cited by examiner

*Primary Examiner* — Hee Soo Kim
(74) *Attorney, Agent, or Firm* — FINNEGAN, HENDERSON, FARABOW, GARRETT & DUNNER, LLP.

(57) ABSTRACT

A system and a method to facilitate sharing media resources of a computing device with a data device integrated with the system are described for enabling a network based communication with a remote device. The system receives a device information pertaining to available computing devices through a discovery manager. The system selects the computing device from the available computing devices. The system enables to initiate a communication between the data device and the remote device. Upon initiation of the communication, the system receives communication data from the computing device, wherein the communication data are obtained using the shared resources of the computing device. The system transmits the received communication data to the remote device for facilitating the network based communication with the remote device.

22 Claims, 9 Drawing Sheets

SYSTEM AND METHOD FOR SHARING MEDIA RESOURCES FOR NETWORK BASED COMMUNICATION

FIELD OF INVENTION

The present invention relates generally to data devices such as set-top box (STB), and more particularly to sharing media resources of an external computing device with data devices for network based communication.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Data devices such as, for example, set-top box (STB) devices have evolved in the functionality, which provides a user with access to entertainment media such as audio and video signals. The STB devices are generally connected to external display devices so as to enable the user to access entertainment media, however such external display devices may not have inbuilt camera and microphone. The STB devices have a built-in communication application, however, without an image capturing device such as camera, and microphone, the STB devices would not be able to send audio or video signals to a remote end device while using built-in communication application.

Therefore, the user may need an external camera and microphone which can be directly connected to the STB devices, thereby increasing the overall cost. Moreover, there is no such camera and microphone available which can be compatible on all types of STBs. Due to limited compatibility of the camera and the microphone, the communication application has a limited usage in the STB devices.

There is, therefore, a requirement in the art for an effective and economical system and method that can overcome aforementioned problems in the art and can effectively enable a network based communication through a data device by facilitating sharing of media resources without the need for built-in resources.

OBJECTS OF THE PRESENT DISCLOSURE

Some of the objects of the present disclosure, which at least one embodiment herein satisfies are as listed herein below.

It is an object of the present disclosure to enable a method and system that can enable sharing of the resources such as camera and microphone which are commonly available on devices such as mobile phone or laptop for communication.

It is an object of the present disclosure to eliminate the need of external compatible devices such as camera and microphone, which also avoids compatibility issues of the external devices for communication.

It is an object of the present disclosure to enable data devices such as STB to transmit the media data over the internet in the communication.

It is an object of the present disclosure to aggregate all the local streams available to one stream such as video conferencing and forward the aggregated streams to another party.

It is an object of the present disclosure to allow aggregation of individual internet of things (IOT) security camera stream available to the user when all the security cameras are connected to same network, from which the user can communicate with STB, thus eliminating the need to IOT-Servers.

It is an object of the present disclosure to enable use in applications such as sharing video and audio data, video editor applications, augmented reality applications, and so on.

It is an object of the present disclosure to provide method and system that are economical.

SUMMARY

This section is provided to introduce certain objects and aspects of the present invention in a simplified form that are further described below in the detailed description. This summary is not intended to identify the key features or the scope of the claimed subject matter.

In an aspect, the proposed system is configured to facilitate sharing media resources of a computing device with a data device integrated with the system for enabling a network based communication with a remote device. The system is configured with the data device and includes one or more processors coupled with a memory, wherein the memory stores instructions which when executed by the one or more processors causes the system to receive, from a discovery manager coupled with the system, a device information pertaining to available computing devices; select the computing device from the available computing devices; initiate a communication between the data device and the remote device; upon initiation of the communication, receive, from the selected computing device, through at least one port, a communication data, and transmit, through a communication module of the data device, the received communication data to the remote device for facilitating the network based communication with the remote device.

The present disclosure further provides for a method for facilitating sharing media resources of a computing device with a data device for enabling a network based communication with a remote device, where the method comprises the steps of: receiving, from a discovery manager, by a system configured with the data device, a device information pertaining to available computing devices; selecting the computing device from the available computing devices; initiating a communication between the data device and the remote device; upon initiation of the communication, receiving, from the selected computing device, through at least one port, a communication data, and transmitting, through a communication module of the data device, the received communication data to the remote device for facilitating the network based communication with the remote device.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 1 illustrates an exemplary network architecture in which or with which the system of the present disclosure can be implemented, in accordance with an embodiment of the present disclosure.

Figure 1:
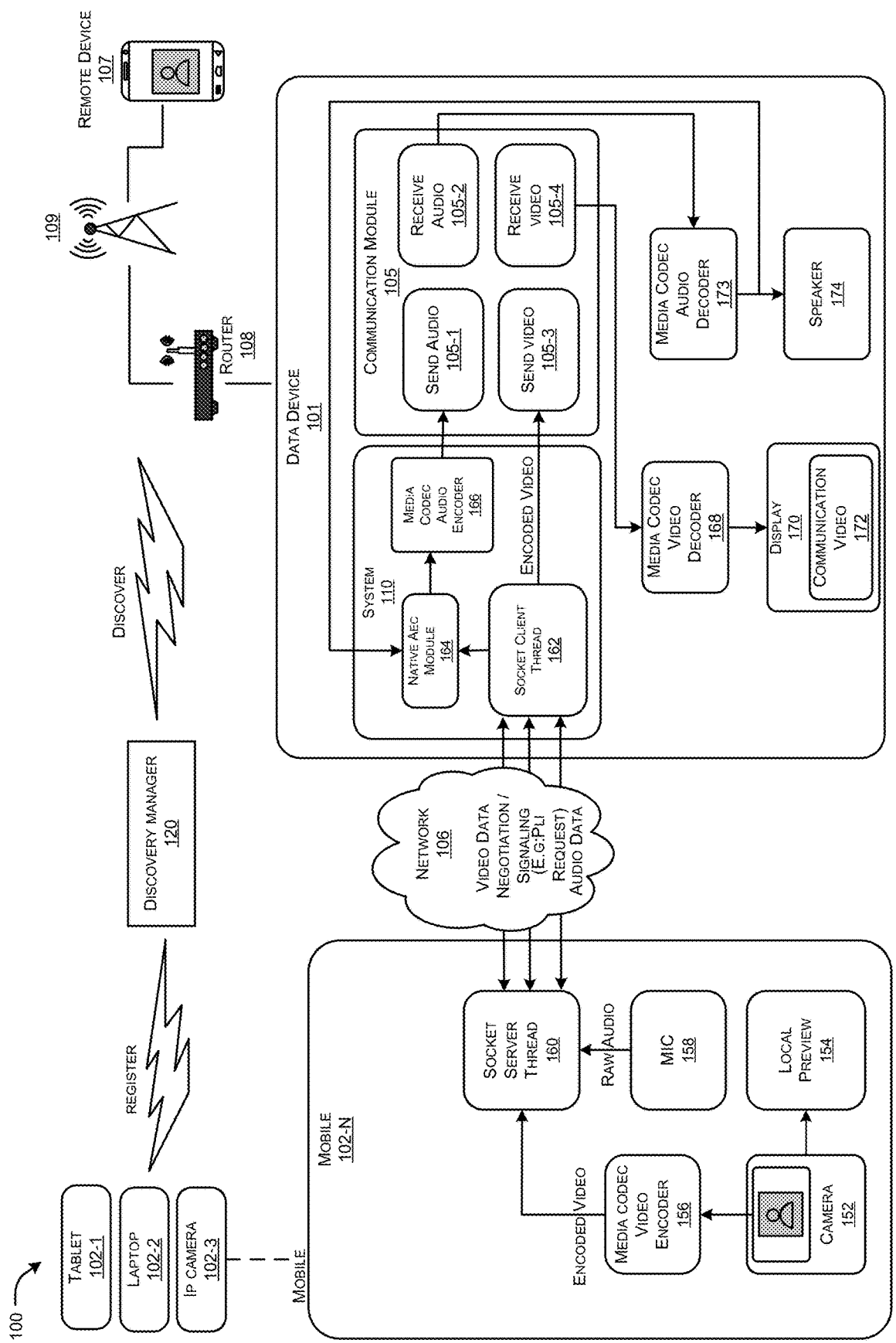

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The present invention provides a solution to the above-mentioned problem in the art by providing a system and a method for sharing media resources with a data device, such as, for example, a set-top box (STB) for applications such as, for example, communication involving use of audio and video. Particularly, the system and method establishes a communication between the data device and an available computing device associated with a first user. During a communication between the first user and a second user, the data obtained through the shared media resources such as, for example, an image capturing device and a voice recording device are transmitted from the computing device to the data device (such as STB) that further sends the data to the second user having a remote device at a remote end. In this manner, the system utilizes resources of the available computing devices of the first user to enable network based communication with the second user through the data device. In other words, the system and method provide a technical solution of making use of commonly available resources such as, for example, camera, microphone of the computing devices such as, for example, handheld mobile phones, laptop, and other such devices. Thus, the system facilitates effective utilization of resources in a network communication without the need for the data device to have in-built resources. The system and method also facilitate to dynamically discover available computing devices from a plurality of registered computing devices so that the selection of the most suitable computing device may occur in real-time. Several other advantages may be realized.

FIG. 1 illustrates an exemplary network architecture 100 in which or with which system 110 of the present disclosure can be implemented, in accordance with an embodiment of the present disclosure. As illustrated, the system 110 may be configured with a data device 101. The system 110 enables communication between the data device 101 and one or more computing devices 102-1, 102-2 . . . 102-N (individually referred as a computing device 102; and collectively referred to as computing devices 102) for sharing media resources of the computing device 102 with the data device 101 during a communication with a remote device. The data device 101 may be an information appliance that may be devoid of any integrated/in-built media resources such as, for example, camera, microphone, and other accessory based devices. In an exemplary embodiment, the data device 101 may be a set-top box (STB) device having communication features but no media resources integrated with the STB. The computing device 102 may be associated with the first user and may include an electronic device integrated with media resources. In an exemplary embodiment, the computing device 102 may include mobile devices such as for example, tablet, laptop, Internet Protocol (IP) camera, mobile phone or other such devices. In accordance with an embodiment and as illustrated in FIG. 1, the architecture can enable effective communication between the computing device 102 and the data device 101 during the communication between the first user associated with the data device 101 and the second user located at a remote end by utilizing the resources such as image capturing devices such as camera and voice recording device such as microphone to transmit the data to a second user. The media resources include an accessory device integrated or coupled with the computing device for enabling the capture of at least one of the raw audio and raw video or obtaining at least one of the encoded audio data and the encoded video data. For example, the media resource may be an in-built camera and/or a microphone of a mobile phone or a laptop. In another example, the media resource may be an external camera or IP camera that can be coupled to the computing device or data device.

In an example embodiment, the communication may include at least one of audio call, video call, augmented virtual reality based communication and combinations thereof such as, for example, combination of audio call and video call. In an embodiment, the data device 101 may have the capability to establish a communication with a second user located at a remote end through a remote device 107 associated with the second user. The communication module 105 may communicate with the remote device 107 located at a remote end through a router 108 and a base station 109. As the data device 101 may not have internal media resources such as, for example, inbuilt camera and microphone in data device 101, the data device 101 may not be able to provide data such as audio and/or video data to the remote device 107 directly. However, the present system 110 may enable the sharing of the media resources of the computing device 102 with the data device 101 for smooth execution of communication (involving audio and video communication) between the first user and the second user. In other words, the proposed system 110 makes use of these readily available devices to perform audio, video communication and any additional communication services. In order to share the media resources of the computing device 102 with the data device 101, the data device 101 needs to be connected with computing device 102. The computing device 102 which is ready to share the media resources may register as a service provider. To achieve this, a plurality of registered computing devices may be registered with a network service. In an exemplary embodiment, each computing device 102 may register with the network service through a discovery manager 120. The system may be coupled to a discovery manager 120 that enables to dynamically discover the available computing devices 102 from a plurality of registered computing devices. In an exemplary embodiment, the dynamic discovery may be performed by assessing if the available computing devices are in the vicinity of the system 110 based on a pre-defined threshold distance or within a reachable vicinity of the network or a wireless network such as, for example, Wi-Fi based network. The pre-defined threshold distance may be a physical distance of the computing device from the system that may enable detection/discovery of the computing device 102. For example, one or more mobile phones of the first user may be in vicinity such as, within 1 meter distance from the system and may be detectable by the discovery manager 120. For example, one or more mobile phones of the first user may be in vicinity such as, within the same Wi-Fi range or in the same network or reachability. It may be appreciated that the mentioned pre-defined threshold distance is only exemplary and may vary in other scenarios. In an alternate embodiment, the data device 101/discovery manager 120 may discover the computing devices through the network service modules such as network service discovery (NSD) module and so on. In an example embodiment, the NSD module may allow the system to know regarding the available supporting devices within the vicinity/desired network. For example, this can be within the vicinity of the same Wi-Fi or in other scenario this can be to determine the available external resourcing devices by explicitly configuring them. In the process of network service discovery, the data device 101 such as STB may dynamically discover the computing devices 102, through the discovery manager 120, and select one of the available computing devices for effective network based communication during outgoing communication and incoming communication. It may be appreciated that the network based communication may not be limited to calling service and can include any communication service like screen sharing, video/audio sharing, whiteboard presentation and other such features.

In an embodiment, the system 110 may receive a device information from the discovery manager 120. The device information may pertain to available computing devices. In an exemplary embodiment, the device information may be in the form may be collective list including an identifier information pertaining to the available computing devices. For example, the identifier information may include at least one of a port information and an internet protocol (IP) address pertaining to the available computing devices 102. In an example embodiment, the at least one port may include at least one of a pre-defined port or a dynamic port. The port information may pertain to the at least one port that may enable the communication between the computing device 102 and the data device 101. In an example embodiment, the discovery manager 120 may receive the identifier information through the NSD module associated with the network service. For example, the system 110 configured in the data device 101, may request the NSD module to provide IP address information and port information for available devices. Based on the available devices in the collective list, the system 110 may enable selection of the computing device from the available computing devices. In an exemplary embodiment, the computing devices 102 may be selected from the available computing devices based on user input from the first user. In an embodiment, upon selection of the computing device 102, the system 110 may prepare to initiate a communication between the data device 101 and the remote device 107. As the communication may be an outgoing communication or an incoming communication, the system 110 may trigger the communication or accept the communication respectively.

In an embodiment, prior to initiation of the communication, the system 110 may request the computing device 102 to confirm the possibility to initiate the communication. In an exemplary embodiment, the request may be sent and confirmed through the at least one port by an exchange of signalling commands between the data device 101 and the selected computing device 102. The exchange of signalling commands may occur through a network 106. In an embodiment, upon receipt of confirmation from the computing device 102, the system may facilitate a transmission of parameters and codec information between the data device 101 and the computing device 102. In an embodiment, the transmission of parameters may include negotiation that may be done when the computing device 102 is discovered and finalized, so that communication parameters and media services of computing device 102 are in synchronization with requirements of the communication. Thus, the transmission of the parameters may enable to assess if the media resources of the computing device are in compliance with requirements of the network based communication. In an exemplary embodiment, the parameters may include at least one of audio parameters and video parameters corresponding to the media resources of the computing device 102. For example, the parameters may pertain to at least one of audio codec, video codec, corresponding resolution, and orientation of the video. In an embodiment, the system 110 may interact with the communication module 105 to enable receipt of the codec information that is to be transmitted to the computing device 102. The codec information may be associated with encoding or decoding attributes of the communication data. For example, the codec information may include audio-video codecs pertaining to at least one of bitrate, sample rate, video format, bitrate, profile level and frame rate. In an exemplary embodiment, the exchange of signalling commands and the transmission of parameters and codec information may be performed through a socket service, based on the IP address of the computing device 102. The socket service may enable an end point of two way communication for transmission of the communication data from the computing device 102 to the data device 101. For example, the socket service may be initiated between a socket server thread 160 pertaining to the computing device 102 and a socket client thread 162 pertaining with the data device 101. In an exemplary embodiment, the socket service may be enabled through the at least one port associated with the computing device 102. For example, the at least one port may be a command port allowing all the negotiation and signalling information. The main purpose of the socket layer is to send and receive the information from one device to the other device. This may not be just limited to socket communication, this can be extended to any other means to transfer the data from one device to other device e.g: Bluetooth Zigbee etc.

In an embodiment, upon initiation of the communication, the system 110 may receive a communication data from the selected computing device. For example, communication data may include at least one of a textual data, an augmented virtual reality data, a video data and an audio data. In an exemplary embodiment, the communication data may be received by the data device 101 through the at least one port. The audio data and the video data be in encoded form and may be derived from raw audio and raw video respectively captured using the media resources of the selected computing device 102. In another exemplary embodiment, the audio data and the video data be in encoded and/or raw form while sending to the data device 101. In an exemplary embodiment, the raw audio and the raw video may be encoded using encoders coupled to the computing device 102 and/or the data device 101. As illustrated in FIG. 1, the computing device 102 may include a camera 152, using which raw video data may be obtained. The camera 152 may enable to capture the raw video data as desired by first user. The raw video data may also be checked by a local preview option 154 such as, for example, a display associated with the computing device 102. The raw video data may be encoded using media codec video encoder 156 such that the resultant encoded video may be sent to the socket server thread 160 for further transmission to the socket client thread 162 of the data device 101. Similarly, the computing device 102 may include a microphone or mic 158, using which raw audio data may be obtained and sent to socket server thread 160. In an exemplary embodiment, the socket server thread 160 may receive and transmit the raw audio data to the socket client thread 162, wherein the raw audio data may be encoded at media codec audio encoder 166 of the data device 101 after pre-processing such as, for example, for acoustic echo cancellation (AEC) using native AEC module 164 of the data device 101. The socket client thread 162 of the data device 101 may send the communication data (encoded/raw audio data and/or encoded/raw video data) to the communication module 105 of the data device 101. The communication module 105 may enable to transmit the received communication data from the data device to the remote device 107. In an exemplary embodiment, the communication module 105 may send the encoded/raw audio and the encoded/raw video using sub-modules 105-1 and 105-3 respectively. The communication module 105 may communicate with the remote device 107 located through router 108 and base station 109. In an exemplary embodiment, the communication module 105 may receive a response communication data form the remote device 107. The response communication data may include an encoded audio response data and an encoded video response data. The response communication data may be received from the remote device 107 at sub-modules 105-2 and 105-4, respectively, of the communication module 105. The data device 101 may also include a media codec video decoder 168 for decoding the received encoded video response data to obtain decoded video response data. The data device 101 may also include a media codec video decoder 173 for decoding the encoded audio response data to obtain decoded audio response data. The response communication data, after decoding, may be viewed and heard using a display 170 (to view video 172) and a speaker 174 respectively associated with the data device 101. In an exemplary embodiment, the encoded audio response data may be sent to the native AEC module 164 for pre-processing (acoustic echo cancellation) prior to decoding. The system 110 thus facilitates a network based communication to enable the communication between the first user using the data device 101 and a second user using the remote device 107. The communication may include at least one of outgoing communication and incoming communication such that the outgoing communication may be initiated by the data device 101 to the remote device 107 and the incoming communication is initiated by the remote device 107 to the data device 101.

In an embodiment, the network 106 can be a wireless network, a wired network or a combination thereof that can be implemented as one of the different types of networks, such as Intranet, Local Area Network (LAN), Wide Area Network (WAN), Internet, and the like. Further, the network 106 can either be a dedicated network or a shared network. The shared network can represent an association of the different types of networks that can use variety of protocols, for example, Hypertext Transfer Protocol (HTTP), Transmission Control Protocol/Internet Protocol (TCP/IP), Wireless Application Protocol (WAP), Automatic repeat request (ARQ), and the like.

In an embodiment, when the request for audio and/or video service may be received by the computing device 102, the computing device 102 may open the at least one port for audio and video transmission, wherein the system 110 may receive the communication data through these ports. In an exemplary embodiment, the computing device 102 may start recording raw data through microphone and camera and send the recorded data to respective encoders, where the encoded data may be transmitted through the port. When the system 110 receives the data, the received data may be further processed, if required and transmitted to the remote end through one or more communication modules of the data device 101, as part of the communication.

Figure 2:
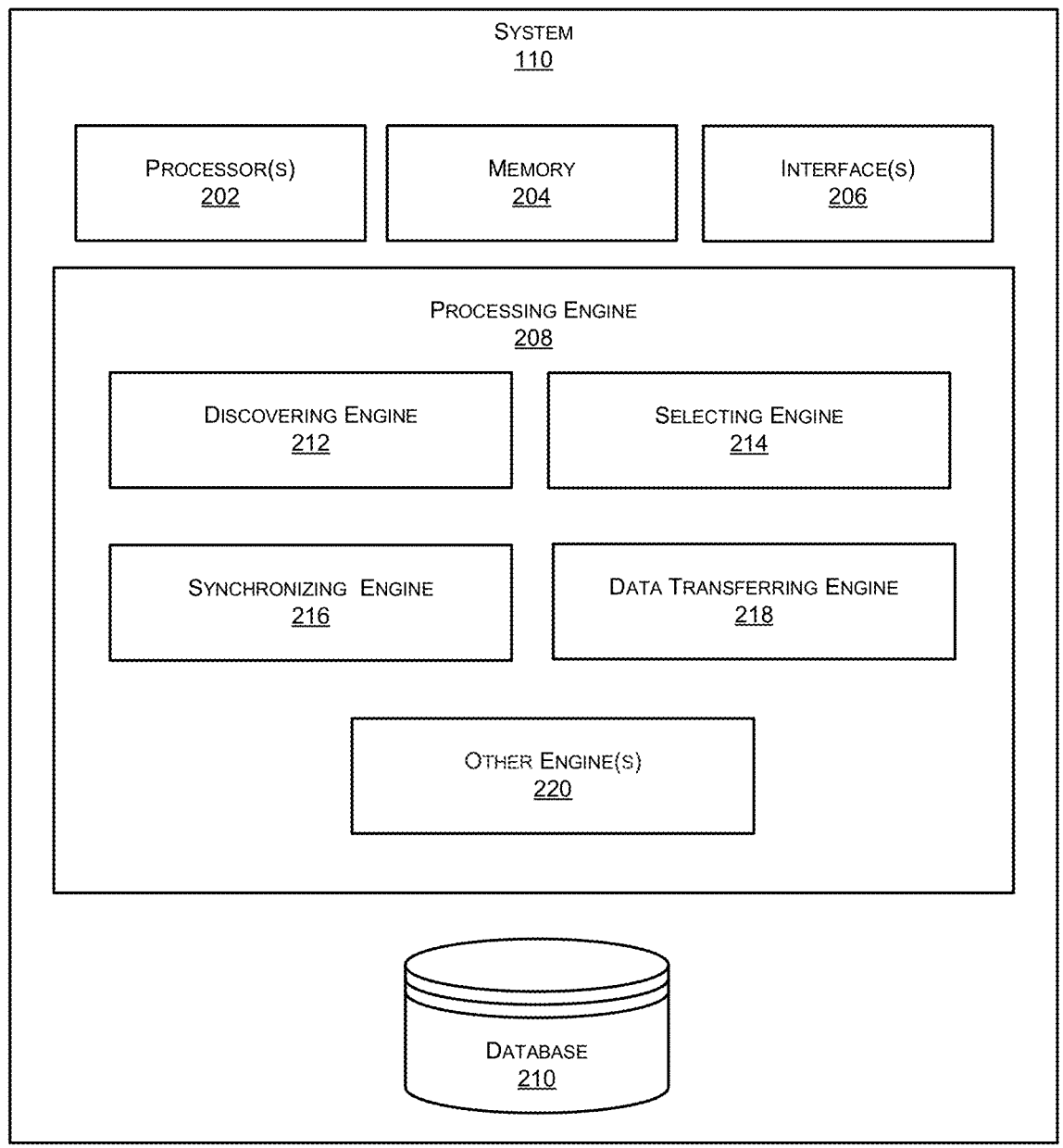
FIG. 2 illustrates exemplary functional components of the proposed system, in accordance with an embodiment of the present disclosure.

In an embodiment, the system 110, configured for sharing media resources with data device 101 (such as STB), may include one or more processors coupled with a memory, wherein the memory may store instructions which when executed by the one or more processors may cause the system to perform the steps as described hereinabove. FIG. 2 with reference to FIG. 1, illustrates an exemplary representation of system 110 for sharing the media resources with the data device 101, in accordance with an embodiment of the present disclosure. In an aspect, the system 110 may comprise one or more processor(s) 202. The one or more processor(s) 202 may be implemented as one or more microprocessors, microcomputers, microcontrollers, digital signal processors, central processing units, logic circuitries, and/or any devices that process data based on operational instructions. Among other capabilities, the one or more processor(s) 202 may be configured to fetch and execute computer-readable instructions stored in a memory 204 of the system 110. The memory 204 may be configured to store one or more computer-readable instructions or routines in a non-transitory computer readable storage medium, which may be fetched and executed to create or share data packets over a network service. The memory 204 may comprise any non-transitory storage device including, for example, volatile memory such as RAM, or non-volatile memory such as EPROM, flash memory, and the like.

In an embodiment, the system 110 may include an interface(s) 206. The interface(s) 206 may comprise a variety of interfaces, for example, interfaces for data input and output devices, referred to as I/O devices, storage devices, and the like. The interface(s) 206 may facilitate communication of the system 110. The interface(s) 206 may also provide a communication pathway for one or more components of the system 110. Examples of such components include, but are not limited to, processing engine(s) 208 and a database 210.

The processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the system 110 may comprise the machine-readable storage medium storing the instructions and the processing resource to execute the instructions, or the machine-readable storage medium may be separate but accessible to the system 110 and the processing resource. In other examples, the processing engine(s) 208 may be implemented by electronic circuitry.

The processing engine 208 may include one or more engines selected from any of a discovering engine 212, a selecting engine 214, a synchronizing engine 216, data transferring engine 218, and other engines 220. In an embodiment, the discovering engine 212 may co-ordinate with discovery manager to start discovering the computing device for the required service e.g. image capturing service, or voice recording service on the network. To discover the computing device, the discovering engine 212 may send a request to the discovery manager to send the internet protocol (IP) and port information for the available computing devices for required services. In response, the discovery manager 120 may send collective list of available computing devices to the system 110. The collective list of available devices may be presented on the external device connected to the data device 101.

In an embodiment, the selecting engine 214 may select one of the available computing devices for the required service based on an input received from the user. In an exemplary embodiment, the selecting engine 214 may select one of available computing devices for the image capturing service and/or voice recording service.

In an embodiment, when the communication is triggered to a network and upon communication establishment, the synchronizing engine 216 may be configured to exchange signalling commands associated with one or more parameters such as resolution, audio-video codecs, orientation, transport and so on with the computing device so as to synchronize communication parameters and media services to perform the communication.

In an embodiment, upon synchronization, data transferring engine 218 may receive the data transmitted by the computing device over a network 106, where the received data may be transmitted to the second computing device 107 through the communication module 105. In another embodiment, the data from the computing device can directly be transmitted to the second computing device 107 at remote end.

In an embodiment, the other engines 220 may provide assistance to at least one of the discovering engine 212, the selecting engine 214, a synchronizing engine 216, data transferring engine 218 in the communication. The database 210 may comprise data that may be either stored or generated as a result of functionalities implemented by any of the components of the processing engine(s) 208 of the system 110.

Figure 3A:
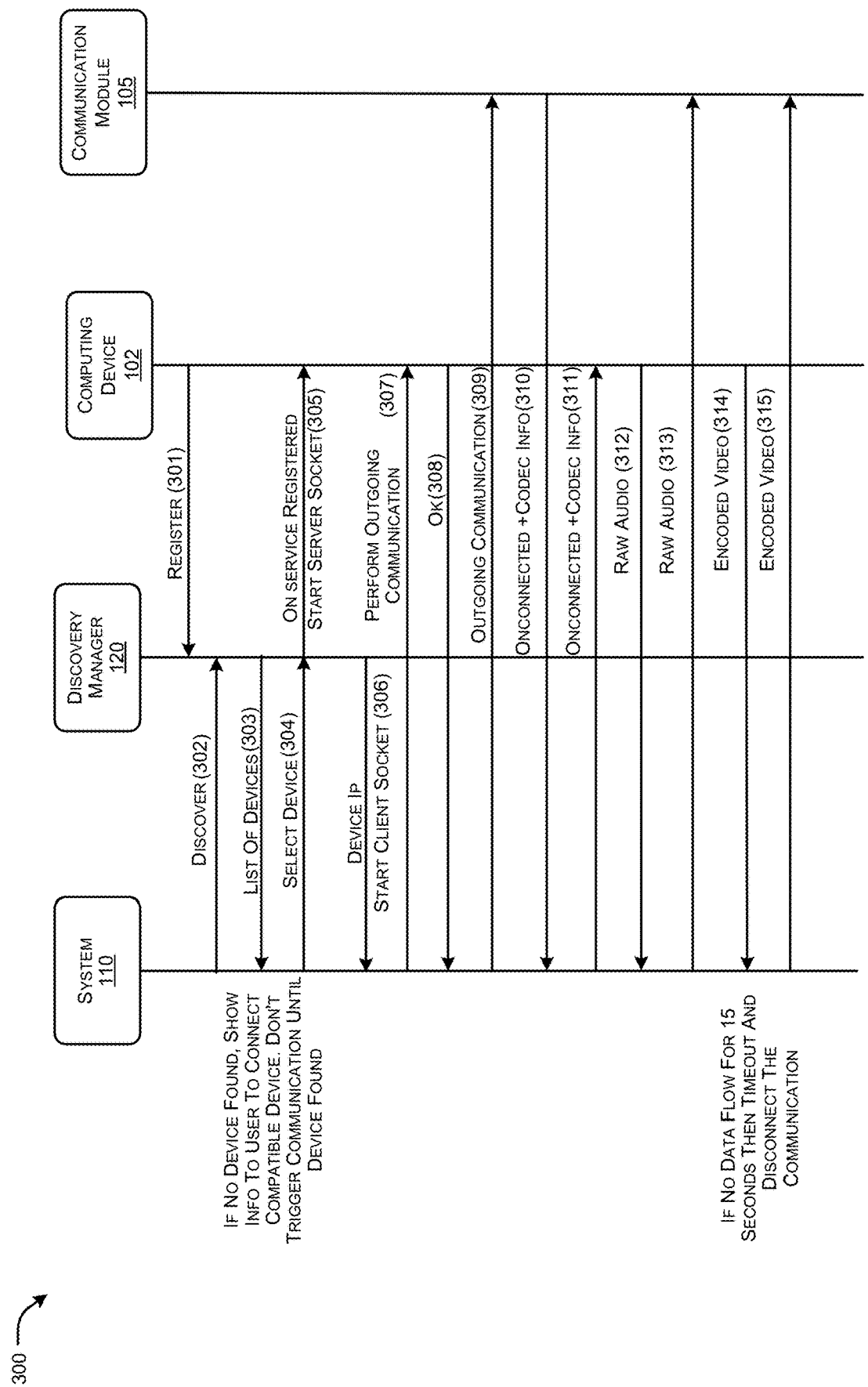
FIGS. 3A and 3B illustrate exemplary representations of flow diagrams among the system, a discovery manager, the computing device, and communication module for outgoing and incoming communication, respectively, in accordance with embodiments of the present disclosure.
Figure 3B:
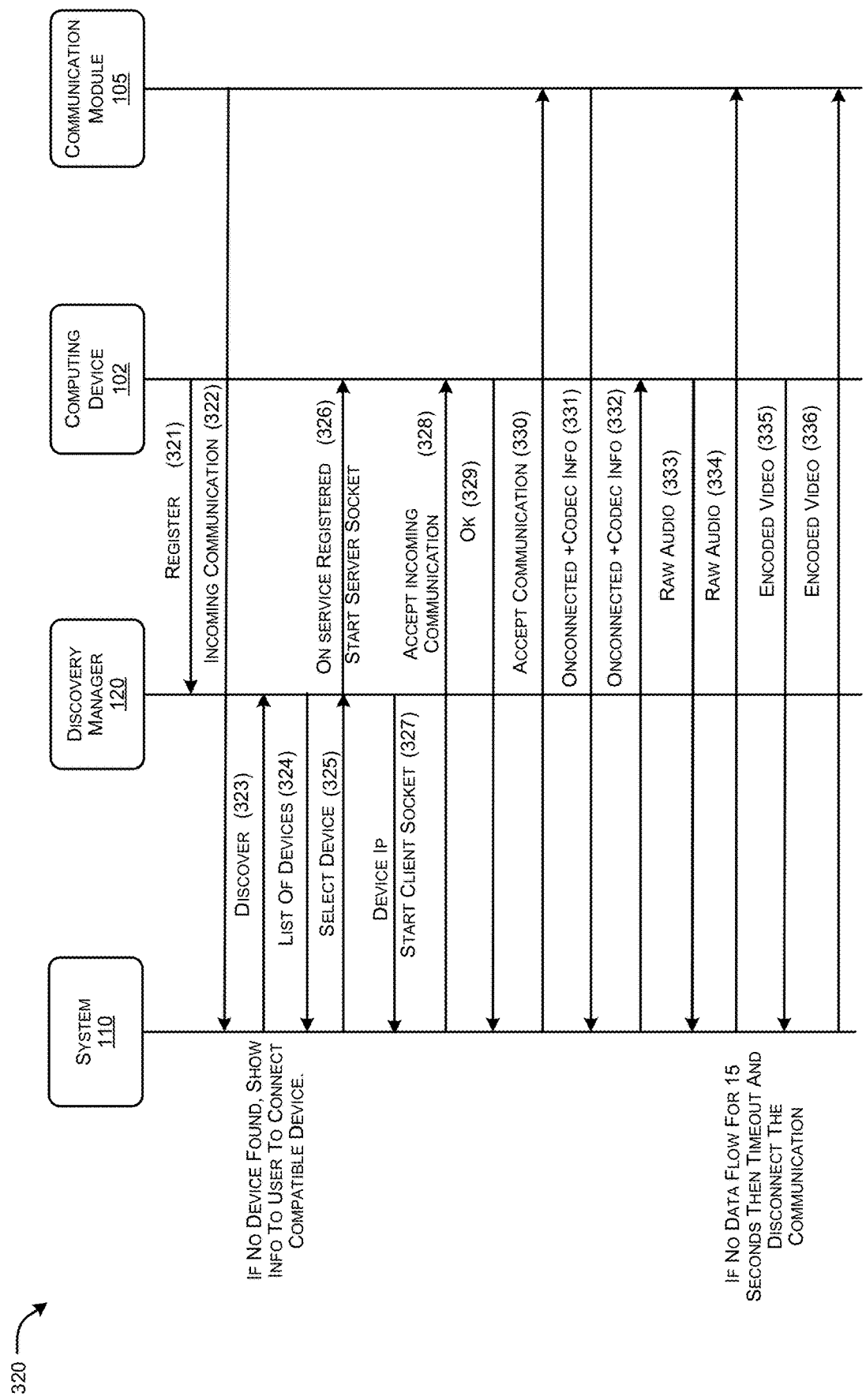

FIGS. 3A and 3B illustrate exemplary representations of flow diagrams showing communication among the system, a discovery manager, the computing device, and communication module for outgoing and incoming communication, respectively, in accordance with embodiments of the present disclosure. As shown in FIG. 3A, the computing device 102 may register (301) with the discovery manager 120. The system 110 may then discover (302) the available registered devices for the required service with the discovery manager 120. In case no device found, a notification to connect a compatible device, is sent to the user. The discovery manager 120 may send (303) the list of available registered devices to the system 110. Based on the input from the user, the system 110 may select (304) the computing device 102 from the list of the available registered devices. The discovery manager 120 may communicate with the computing device to start (305) a server socket on the computing device so as to form an end point of two way communication for sending or receiving the data. Further, the discovery manager 120 may communicate with the system 110 to start (306) a client socket on the system 110 based on the IP address of the device so as to form another end point of two way communication for sending or receiving the data. The system 110 may then check with the computing device whether the outgoing communication can be performed (307). Based on the confirmation (308), the system 110 may request the communication module for the outgoing communication (309). The communication module may send (310) the codec information to the system 110, which may then be sent (311) to the computing device 102, where the codec information is associated with encoding or decoding of the data for transmission. Upon transmission of the codec information, the computing device 102 may send (312) raw audio data to the system 110, which may then be sent (313) to the communication module 105. The computing device 102 may send (314) encoded video data to the system 110, which may then be sent (315) to the communication module 105. It may be appreciated that the mentioned embodiments are only exemplary, and wherein at 312/314, any of raw or encoded data may be sent for any of the audio data and video data.

FIG. 3B illustrates a flow diagram for the incoming communication. As shown in FIG. 3B, the computing device 102 may register (321) with the discovery manager 120. Based upon the request for incoming communication (322), the system 110 may discover (323) the registered devices for the required service with the discovery manager 120. In case no device found, a notification to connect a compatible device, is sent to the user. The discovery manager 120 may send (324) the list of available registered devices to the system 110. Based on the input from the user, system 110 may select (325) the computing device 102 from the list of the available registered devices. The discovery manager 120 may communicate with the computing device to start (326) a server socket on the computing device so as to form an end point of two way communication for sending or receiving the data. Further, the discovery manager 120 may communicate with the system 110 to start (327) a client socket on the system 110 based on the IP address of the device so as to form another end point of two way communication for sending or receiving the data. The system 110 may then check with the computing device whether the incoming communication can be performed (328). Based on the confirmation (329), system may request the communication module for accepting (330) the incoming communication. The communication module may send (331) the codec information to the system 110, which may then be sent (332) to the computing device 102, where the codec information is associated with encoding or decoding of the data for transmission. Upon transmission of the codec information, the computing device 102 may send (333) raw audio data to the system 110, which may then be sent (334) to the communication module 105. The computing device 102 may send (335) encoded video data to the system 110, which may then be sent (336) to the communication module 105.

Figure 4:
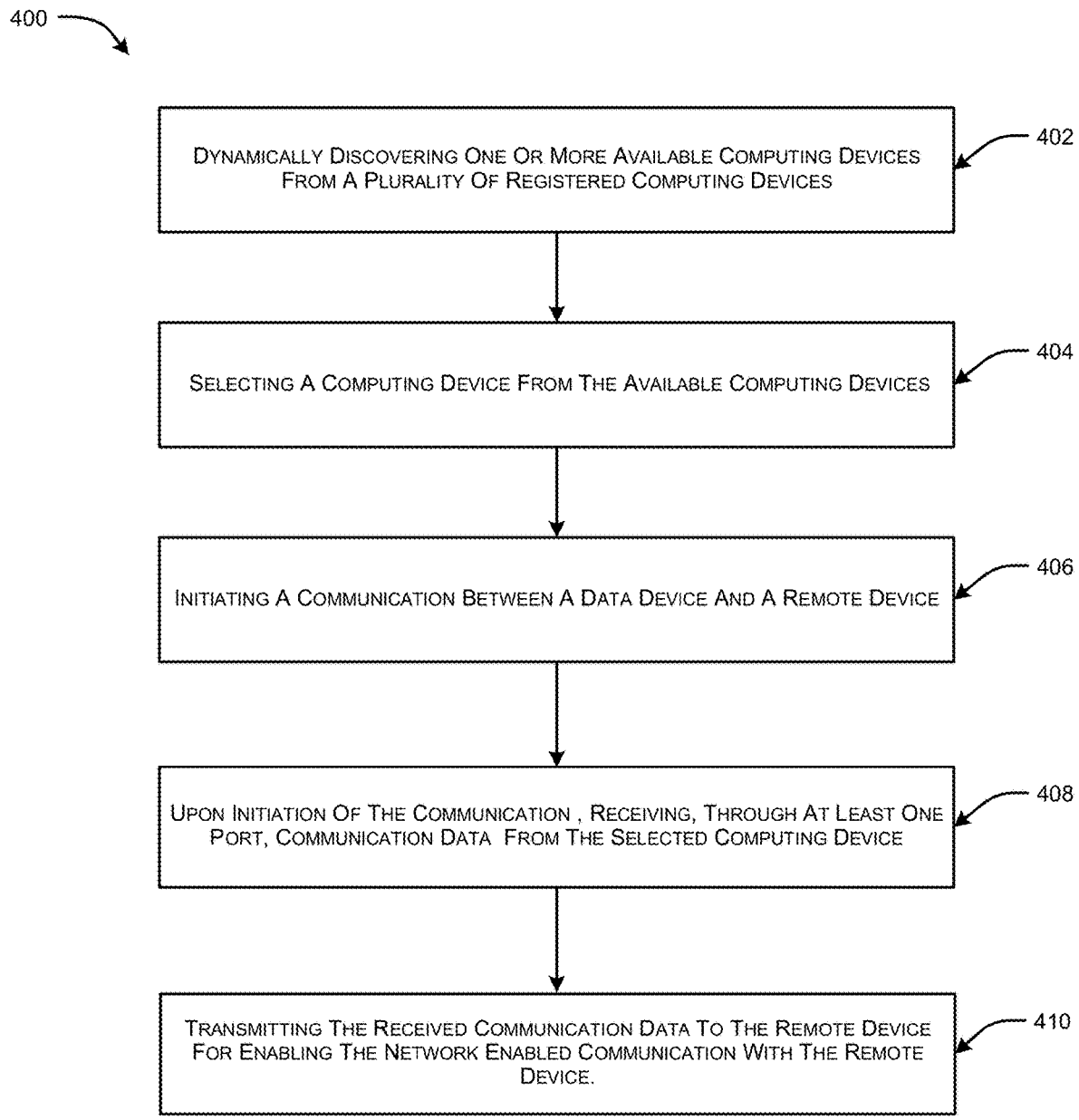
FIG. 4 illustrates an exemplary representation of flow diagram for facilitating sharing media resources of a computing device with a data device for enabling a network based communication with a remote device, in accordance with an embodiment of the present disclosure.

FIG. 4 illustrates an exemplary representation of flow diagram 400 for facilitating sharing media resources of a computing device with a data device for enabling a network based communication with a remote device, in accordance with an embodiment of the present disclosure. The flow diagram 400 may represent a general sequence of steps in case of outgoing communication or incoming communication. At 402, the method may include a step of receiving a device information pertaining to available computing devices. The device information may be received from a discovery manager by a system integrated with the data device. At 404, the method may include a step of selecting the computing device from the available computing devices. At 406, the method may include a step of initiating a communication between the data device and the remote device. Upon initiation of the communication, at 408, the method may include a step of receiving, from the selected computing device, through at least one port, a communication data. In an example embodiment, the communication data may include at least one of a textual data, an augmented virtual reality data, a video data and an audio data. The at least one port may include at least one of a pre-defined port and a dynamic port. At 410, the method may include a step of transmitting, through a communication module of the data device, the received communication data to the remote device for facilitating the network based communication with the remote device.

Figure 5A:
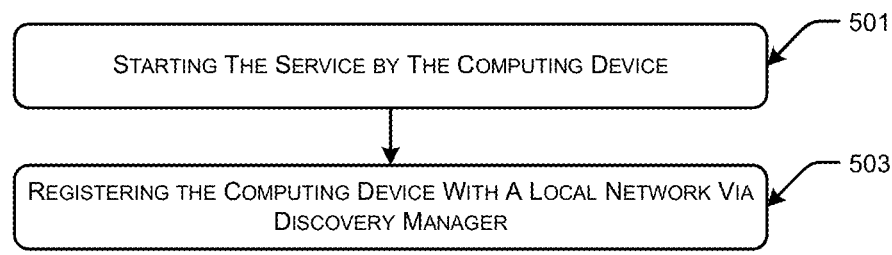
FIG. 5A illustrates an exemplary representation of flow diagram for registration of the computing device with the network through the discovery manager, in accordance with an embodiment of the present disclosure.
Figure 5B:
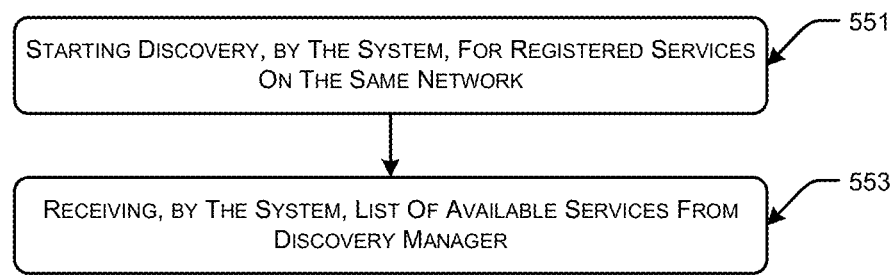
FIG. 5B illustrates an exemplary representation of flow diagram for discovery of the available computing device with the network through the discovery manager, in accordance with an embodiment of the present disclosure.

In an embodiment, the method may include a step of receiving dynamically discovering the available computing devices from a plurality of registered computing devices by the discovery manager. The step of dynamically discovering may be performed by assessing if the available computing devices are in the vicinity of the system based on a pre-defined threshold distance or within a reachable vicinity of the network or a wireless network. The plurality of registered computing devices may be registered with a network service. FIG. 5A illustrates an exemplary representation of flow diagram 500 for registration of the computing device with the network through the discovery manager, in accordance with an embodiment of the present disclosure. As shown in FIG. 5, the computing device may start (501) the service and the computing device may then be registered (503) with a local network via a discovery manager. FIG. 5B illustrates an exemplary representation of flow diagram 550 for discovery of the available computing device with the network through the discovery manager, in accordance with an embodiment of the present disclosure. The system may start (551) discovery of the registered computing devices on the local network. In particular, the system may raise a request for the available registered computing devices for the required service. In response, the system may receive (553) a list of available registered computing devices from the discovery manager.

The device information may be in the form of a collective list including an identifier information pertaining to the available computing devices. In an example embodiment, the computing device may be selected from the available computing devices based on a user input from a first user. The identifier information may include at least one of a port information and an internet protocol (IP) address pertaining to the available computing devices. In an example embodiment, the IP address can be IPv4 or IPv6. The port information may pertain to the at least one port. The discovery manager may receive the identifier information through a network service discovery (NSD) module associated with the network service. Prior to the initiation of the communication, the method may include a step of requesting, through the at least one port, the computing device to confirm the possibility to initiate the communication. In an exemplary embodiment, the request may be placed and confirmed by an exchange of signalling commands between the data device and the selected computing device. Upon receipt of confirmation from the computing device, the method may include facilitating, by the system, transmission of parameters and codec information between the data device and the computing device. The transmission of the parameters may enable to assess if the media resources of the computing device are in compliance with requirements of the network based communication. The parameters may include at least one of audio parameters and video parameters corresponding to the media resources of the computing device. The parameters may pertain to at least one of audio codec, video codec, corresponding resolution and orientation of the video. The system may interact with the communication module to enable receipt of the codec information that is to be transmitted to the computing device. The codec information may be associated with encoding or decoding attributes of the communication data. For example, the codec information may include audio-video codecs pertaining to at least one of bitrate, sample rate, video format, bitrate, profile level and frame rate. In an exemplary embodiment, the exchange of signalling commands and the transmission of parameters and codec information may be performed through a socket service, based on the IP address of the computing device, for enabling an end point of two way communication for transmission of the communication data from the computing device to the data device. The socket service may be initiated between a socket server thread pertaining to the computing device and a socket client thread pertaining with the data device. The audio data and the video data may be in an encoded form and may be derived from raw audio and raw video respectively that are captured using the media resources of the selected computing device. The raw audio and the raw video may be encoded using encoders coupled to the computing device and/or the data device.

Figure 6A:
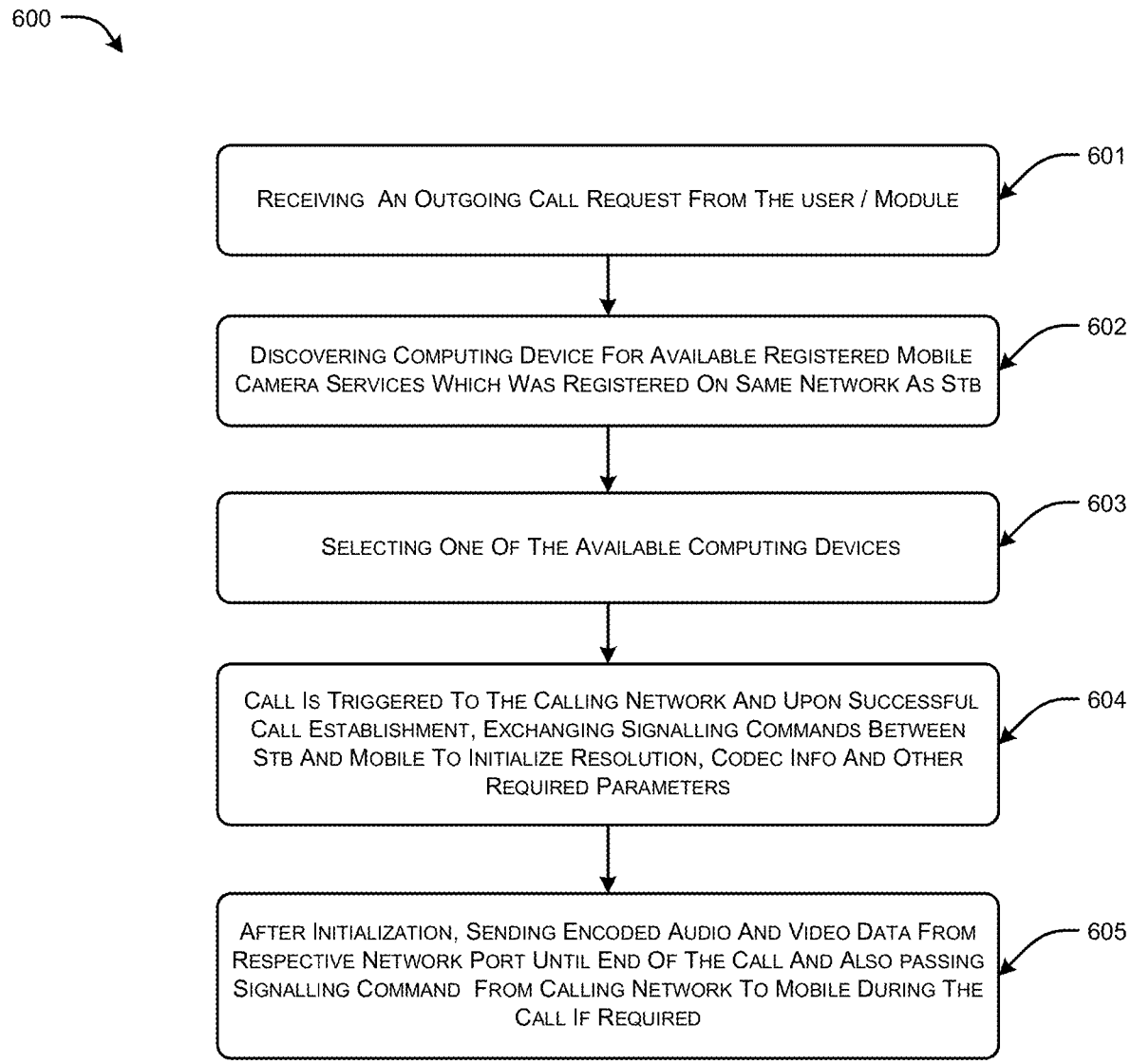
FIGS. 6A and 6B illustrate exemplary representation of flow charts of the proposed system for outgoing and incoming calls, respectively, in accordance with embodiments of the present disclosure.
Figure 6B:
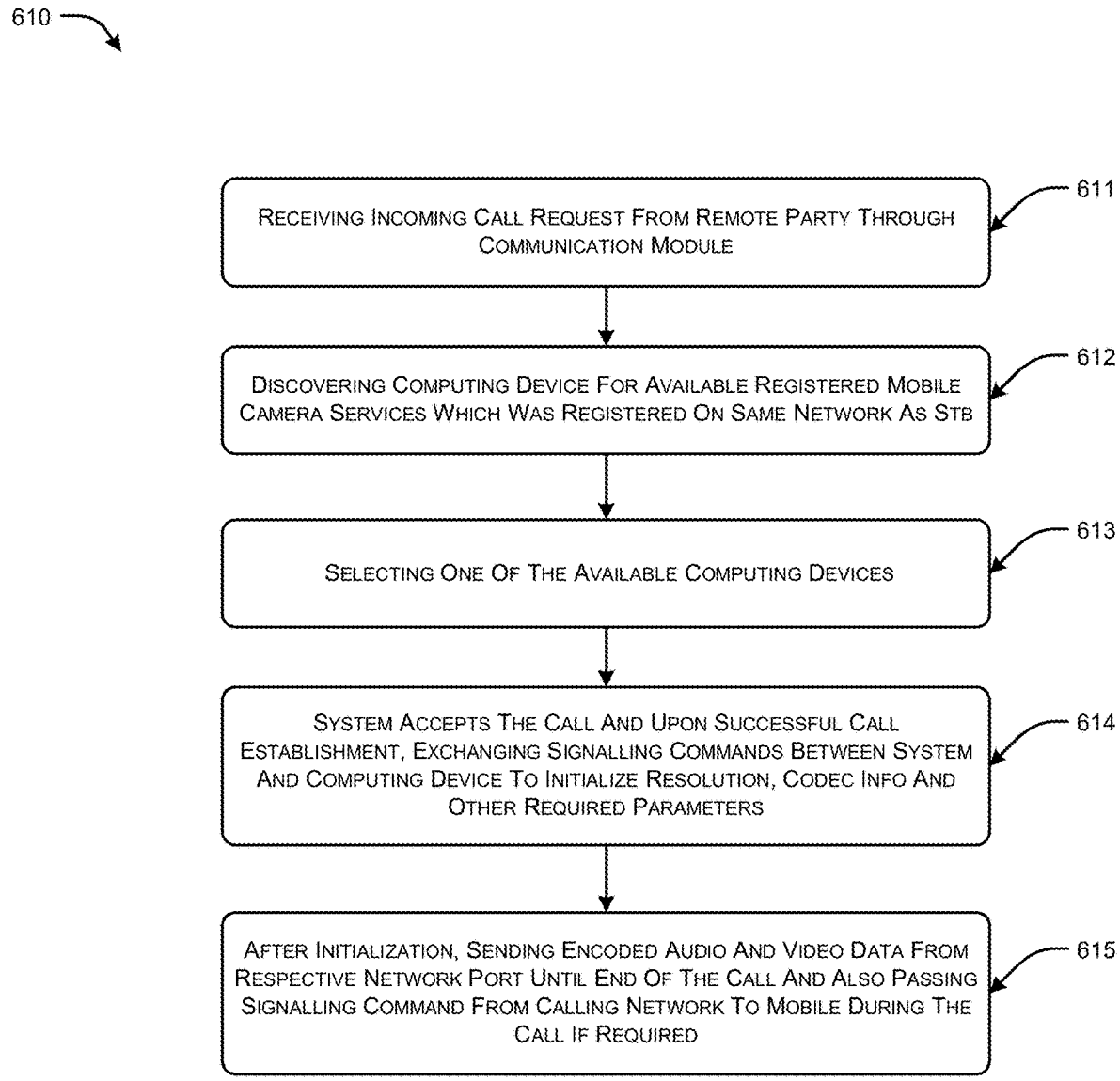

The method may facilitate network based communication that may enable the communication between the first user using the data device and a second user using the remote device. The communication may include at least one of an outgoing communication and an incoming communication. The outgoing communication may be initiated by the data device to the remote device and the incoming communication may be initiated by the remote device to the data device. In an embodiment, the communication may include at least one of audio based communication, video communication such as, for example, at least one of audio call, video call, an augmented virtual reality based communication and combinations thereof such as, for example, a communication including combination of audio call and video call. In an alternate embodiment, the method may also be used in a generic approach that may include dependency of streams from one or more external devices. FIGS. 6A and 6B illustrate exemplary representation of flow charts of the proposed system for outgoing and incoming calls, respectively, in accordance with embodiments of the present disclosure. As shown in FIG. 6A, the proposed system may receive (601) a communication request in a form of an outgoing call request from the user or communication module. Based on the request, the system may discover (602) for available registered computing devices for camera or microphone. The system may then select (603) one of the available registered computing devices based on the input received from the user. When the outgoing call is triggered to the calling network and upon successful call establishment, signalling commands are exchanged (604) between the STB and the computing device to initialize codec information and information associated with other parameters such as resolution, audio-video codecs, orientation, and so on. Upon initialization, encoded/raw audio and/or video data may be sent (605) from the computing device e.g., mobile and so on to the call module. Further, the signalling commands may also be passed from the calling network from the computing device during the call communication if required.

In an embodiment, when the communication is in a form of an incoming call, as shown in FIG. 6B, the proposed system may receive (611) an incoming call request from the user or the communication module. Based on the request, the system may discover (612) for available registered computing devices for camera or microphone. The system may then select (613) one of the available registered computing devices based on the input received from the user. Then, the incoming call request is accepted and upon successful call establishment, signalling commands are exchanged (614) between the STB and the computing device to initialize codec information and information associated with other parameters such as resolution, audio-video codecs, orientation, and so on. Upon initialization, encoded/raw audio and/or video data may be sent (615) from the computing device e.g., mobile and so on to the communication module. Further, the signalling commands may also be passed from the calling network from the computing device during the call communication if required.

Figure 7:
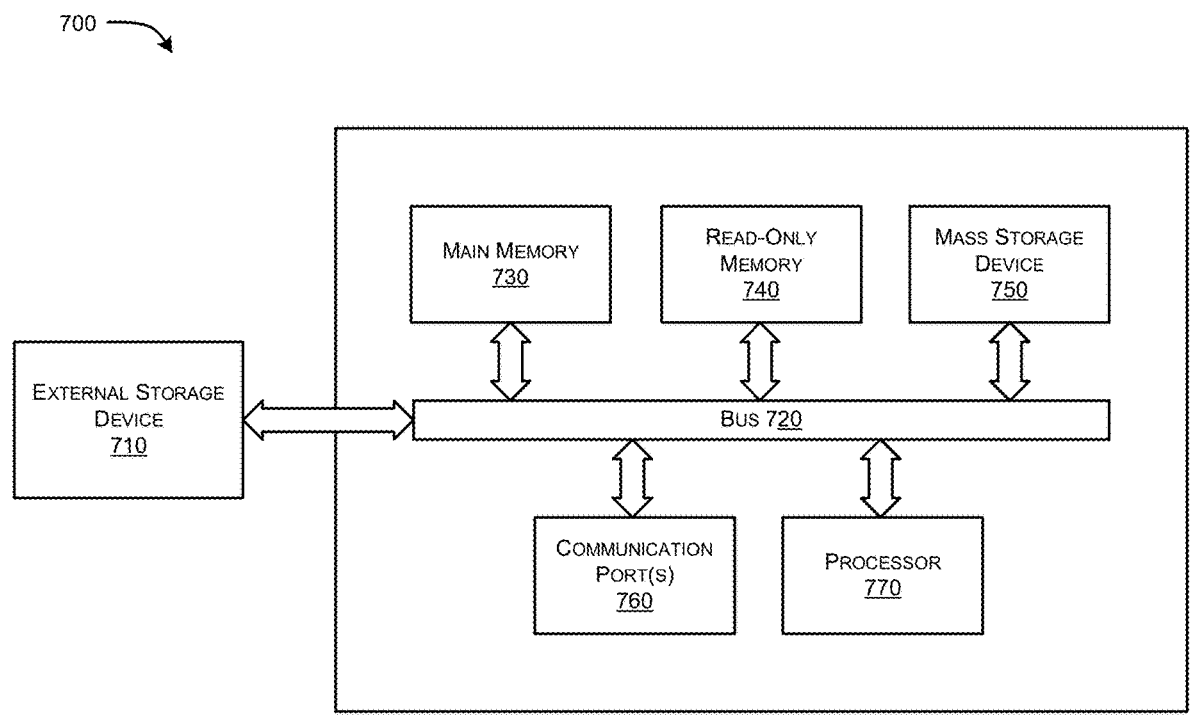
FIG. 7 illustrates an exemplary computer system in which or with which embodiments of the present invention can be utilized in accordance with embodiments of the present disclosure.

FIG. 7 illustrates an exemplary computer system in which or with which embodiments of the present invention can be utilized in accordance with embodiments of the present disclosure. As shown in FIG. 7, computer system 700 can include an external storage device 710, a bus 720, a main memory 730, a read only memory 740, a mass storage device 750, communication port 760, and a processor 770. A person skilled in the art will appreciate that the computer system may include more than one processor and communication ports. Examples of processor 770 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 770 may include various modules associated with embodiments of the present invention. Communication port 760 can be any of an RS-232 port for use with a modem based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system connects. Memory 730 can be Random Access Memory (RAM), or any other dynamic storage device commonly known in the art. Read-only memory 740 can be any static storage device(s) e.g., but not limited to, a Programmable Read Only Memory (PROM) chips for storing static information e.g., start-up or BIOS instructions for processor 770. Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 720 communicatively couples processor(s) 770 with the other memory, storage and communication blocks. Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to software system.

Optionally, operator and administrative interfaces, e.g. a display, keyboard, and a cursor control device, may also be coupled to bus 720 to support direct operator interaction with a computer system. Other operator and administrative interfaces can be provided through network connections connected through communication port 760. The external storage device 710 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, the present disclosure provides a technical solution for sharing the media resources with the data device such as STB which has a suitable communication capability without resources such as in-built camera, microphone. The technical solution includes service registration, service discovery and data transmission, which allows sharing resources such as camera and microphone resource with STB-Calling application. The proposed system dynamically selects computing devices available service during outgoing and incoming communication and aggregates all local streams and transmits the aggregated all local streams to other parties involved in the communication. In this manner, the system enables the STB to utilize media resources such as camera, microphone so on associated with a computing device. In other words, the system facilitates the STB to use the camera, microphone and the like of the computing device for various applications such as calling and so on. In this manner, a user can easily communicate with another user through STB during incoming or outgoing communication without the need of any external resources.

The present system and method may not be limited to calling application, but may also be implemented for other applications or may be extended to any other communication service. For example, the system and method can be extended to publish media service over Internet. In another example, the system and method can be extended to aggregate all the local stream available to one stream like video conferencing and forward the aggregated frame to other party. In another example, the system and method can be extended to IOT-Security cameras, wherein all security cameras may be connected to same Optical Network Terminal (ONT) network such that from remote end, a user can communicate with STB and through auto answer, aggregated or individual security camera stream may be made available to the user using the system and method, thus eliminating the need to IOT-Servers. In another example, the system and method can be extended to non-calling STB applications such as, for example, gallery, photo album, video editor applications, Augmented Reality applications. In yet another example, the system and method can be extended to a technique to bundle as a library that can be made available for a third party STB application developer to take advantage of an external camera. Several other extended applications may be performed.

It would be appreciated that the embodiments herein are explained with respect to set-top box devices, however, the proposed system and method can be implemented in any computing device which do not have or whenever they want to use external devices e.g., in-built camera and microphone and so on, without departing from the scope of the invention.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

ADVANTAGES OF THE PRESENT DISCLOSURE

The present disclosure provides a method and a system that can enable sharing of the resources such as camera and microphone which are of commonly available on devices such as mobile phone or laptop for communication.

The present disclosure provides an economical method and a system that can eliminate the need of external compatible devices such as camera and microphone, which also avoids compatibility issues of the external devices for communication.

present disclosure provides a method and a system that can enable STB to transmit the media data over the internet in the communication.

The present disclosure provides a method and a system that can aggregate all the local streams available to one stream such as video conferencing and forward the aggregated streams to another party.

The present disclosure provides a method and a system that can allow aggregation of individual internet of things (IOT) security camera stream available to the user when all the security cameras are connected to same ONT network, from which the user can communicate with STB, thus eliminating the need to IOT-Servers.

The present disclosure provides a method and a system that can enable use in applications such as sharing video and audio data, video editor applications, augmented reality applications, and other such applications.

We claim:

1. A system for facilitating sharing media resources of a computing device with a data device for enabling a network based communication with a remote device, the system configured with the data device and comprising:
   one or more processors coupled with a memory, wherein the memory stores instructions which when executed by the one or more processors causes the system to:
   receive, from a discovery manager coupled with the system, device information pertaining to available computing devices, wherein the discovery manager enables to dynamically discover the available computing devices from a plurality of registered computing devices, and wherein the dynamic discovery is performed by assessing if the available computing devices are in the vicinity of the system based on a pre-defined threshold distance;
   select the computing device from the available computing devices;
   initiate a communication between the data device and the remote device;
   upon initiation of the communication, receive, from the selected computing device, through at least one port, communication data, and
   transmit, through a communication module of the data device, the received communication data to the remote device for facilitating the network based communication with the remote device,
   wherein prior to the initiation of the communication, the system, through the at least one port, requests the computing device to confirm the possibility to initiate the communication, and wherein the request is placed and confirmed by an exchange of signalling commands between the data device and the selected computing device.

2. The system as claimed in claim 1, wherein the communication comprises at least one of audio call, video call, augmented virtual reality based communication and combinations thereof, wherein the communication data comprises at least one of a textual data, an augmented virtual reality data, a video data, and an audio data.

3. The system as claimed in claim 1, wherein the plurality of registered computing devices are registered with a network service.

4. The system as claimed in claim 1, wherein the device information is in the form of a collective list comprising an identifier information pertaining to the available computing devices, and wherein the computing device is selected from the available computing devices based on a user input from a first user.

5. The system as claimed in claim 4, wherein the port includes at least one of a pre-defined port or a dynamic port, wherein the identifier information comprises at least one of a port information and an internet protocol (IP) address pertaining to the available computing devices, wherein the port information pertains to the at least one port, and wherein the discovery manager receives the identifier information through a network service discovery (NSD) module associated with the network.

6. The system as claimed in claim 1, wherein upon receipt of the confirmation from the computing device, the system facilitates transmission of parameters and codec information between the data device and the computing device.

7. The system as claimed in claim 6, wherein the transmission of the parameters enables to assess if the media resources of the computing device are in compliance with requirements of the network based communication, the parameters comprising at least one of audio parameters and video parameters corresponding to the media resources of the computing device, and the parameters pertaining to at least one of audio codec, video codec, corresponding resolution and orientation of the video.

8. The system as claimed in claim 6, wherein the system interacts with the communication module to enable receipt of the codec information that is to be transmitted to the computing device, the codec information being associated with encoding or decoding attributes of the communication data, and wherein the codec information includes audio-video codecs pertaining to at least one of bitrate, sample rate, video format, bitrate, profile level and frame rate.

9. The system as claimed in claim 6, wherein the exchange of signalling commands and the transmission of parameters and codec information are performed through a socket service, based on the IP address of the computing device, for enabling an end point of two way communication for transmission of the communication data from the computing device to the data device, and wherein the socket service is initiated between a socket server thread pertaining to the computing device and a socket client thread pertaining to the data device.

10. The system as claimed in claim 2, wherein the audio data and the video data are in encoded form and are derived from raw audio and raw video respectively captured using the media resources of the selected computing device, the raw audio and the raw video are encoded using encoders coupled to at least one of the computing device and the data device, and wherein the media resources include an accessory device integrated or coupled with the computing device for enabling the capture of at least one of the raw audio and raw video or obtaining at least one of the encoded audio data and the encoded video data.

11. The system as claimed in claim 4, wherein the network based communication enables the communication between the first user using the data device and a second user using the remote device, wherein the communication comprises at least one of an outgoing communication and an incoming communication, and wherein the outgoing communication is initiated by the data device to the remote device and the incoming communication is initiated by the remote device to the data device.

12. The system as claimed in claim 1, wherein the discovery manager is integrated directly with the system or a router associated with the system and wherein the data device includes a set top box.

13. A method for facilitating sharing media resources of a computing device with a data device for enabling a network based communication with a remote device, the method comprising:
receiving, from a discovery manager, by a system configured with the data device, device information pertaining to available computing devices;
dynamically discovering, by the discovery manager, the available computing devices from a plurality of registered computing devices, wherein dynamically discovering the available computed devices comprises assessing if the available computing devices are in the vicinity of the system based on a pre-defined threshold distance;
selecting the computing device from the available computing devices;
upon selection of the computing device, requesting, through at least one port, the computing device to confirm the possibility to initiate a communication, and wherein the request is placed and confirmed by an exchange of signalling commands between the data device and the selected computing device;
upon confirming the possibility to initiate the confirmation, initiating the communication between the data device and the remote device;
upon initiation of the communication, receiving, from the selected computing device, through the at least one port, communication data; and
transmitting, through a communication module of the data device, the received communication data to the remote device for facilitating the network based communication with the remote device.

14. The method as claimed in claim 13,
wherein the plurality of registered computing devices are registered with a network service.

15. The method as claimed in claim 13, wherein the communication comprises at least one of audio call, video call, augmented virtual reality based communication and combinations thereof, wherein the communication data comprises at least one of a textual data, an augmented virtual reality data, a video data and an audio data, wherein the device information is in the form of a collective list comprising an identifier information pertaining to the available computing devices, and wherein the computing device is selected from the available computing devices based on a user input from a first user.

16. The method as claimed in claim 15, wherein the identifier information comprises at least one of a port information and an internet protocol (IP) address pertaining to the available computing devices, wherein the port information pertains to the at least one port, and wherein the discovery manager receives the identifier information through a network service discovery (NSD) module associated with the network service.

17. The method as claimed in claim 13, wherein the method further comprises:
upon receipt of the confirmation from the computing device, facilitating, by the system, transmission of parameters and codec information between the data device and the computing device.

18. The method as claimed in claim 17, wherein the transmission of the parameters enables to assess if the media resources of the computing device are in compliance with requirements of the network based communication, the parameters comprising at least one of audio parameters and video parameters corresponding to the media resources of the computing device, and the parameters pertaining to at least one of audio codec, video codec, corresponding resolution, and orientation of the video.

19. The method as claimed in claim 17, wherein the system interacts with the communication module to enable receipt of the codec information that is to be transmitted to the computing device, the codec information being associated with encoding or decoding attributes of the communication data, and wherein the codec information includes audio-video codecs pertaining to at least one of bitrate, sample rate, video format, bitrate, profile level and frame rate.

20. The method as claimed in claim 17, wherein the exchange of signalling commands and the transmission of parameters and codec information are performed through a socket service, based on the IP address of the computing device, for enabling an end point of two way communication for transmission of the communication data from the computing device to the data device, and wherein the socket service is initiated between a socket server thread pertaining to the computing device and a socket client thread pertaining with the data device.

21. The method as claimed in claim 13, wherein the port includes at least one of a pre-defined port and a dynamic port, wherein the audio data and the video data are in an encoded form and are derived from raw audio and raw video respectively that are captured using the media resources of the selected computing device, the raw audio and the raw video are encoded using encoders coupled to at least one of the computing device and the data device, and wherein the media resources include an accessory device integrated or coupled with the computing device for enabling the capture of at least one of the raw audio and raw video or obtaining at least one of the encoded audio data and the encoded video data.

22. The method as claimed in claim 15, wherein the network based communication enables the communication between the first user using the data device and a second user using the remote device, wherein the communication comprises at least one of an outgoing communication and an incoming communication, and wherein the outgoing communication is initiated by the data device to the remote device and the incoming communication is initiated by the remote device to the data device.

\* \* \* \* \*